(12) United States Patent
Navarro-mascarell et al.

(10) Patent No.: US 8,770,296 B2
(45) Date of Patent: Jul. 8, 2014

(54) HIGH DENSITY BREAKER FLUIDS AND METHODS OF USE THEREOF

(75) Inventors: Raul Navarro-mascarell, Aberdeen (GB); Mark Luyster, Houston, TX (US)

(73) Assignee: M-I L.L.C., Houston, TX (US)

( * ) Notice: Subject to any disclaimer, the term of this patent is extended or adjusted under 35 U.S.C. 154(b) by 587 days.

(21) Appl. No.: 12/991,064

(22) PCT Filed: May 4, 2009

(86) PCT No.: PCT/US2009/042700
§ 371 (c)(1),
(2), (4) Date: Nov. 4, 2010

(87) PCT Pub. No.: WO2009/137399
PCT Pub. Date: Nov. 12, 2009

(65) Prior Publication Data
US 2011/0061870 A1    Mar. 17, 2011

Related U.S. Application Data

(60) Provisional application No. 61/050,507, filed on May 5, 2008.

(51) Int. Cl.
*E21B 37/00* (2006.01)
*C09K 8/52* (2006.01)

(52) U.S. Cl.
USPC ............................ 166/312; 507/201

(58) Field of Classification Search
USPC ............... 166/311, 312; 507/201, 260, 267
See application file for complete search history.

(56) References Cited

U.S. PATENT DOCUMENTS

| | | | |
|---|---|---|---|
| 5,813,466 A | 9/1998 | Harris et al. | |
| 5,981,447 A | 11/1999 | Chang et al. | |
| 6,569,814 B1 | 5/2003 | Brady et al. | |
| 2003/0216263 A1 | 11/2003 | Tibbles et al. | |
| 2005/0103496 A1 | 5/2005 | Todd et al. | |
| 2008/0078545 A1* | 4/2008 | Welton et al. | 166/278 |
| 2009/0139766 A1* | 6/2009 | Samuel et al. | 175/2 |
| 2009/0156433 A1* | 6/2009 | Mebratu et al. | 507/213 |
| 2011/0061870 A1* | 3/2011 | Navarro-mascarell et al. | 166/311 |

OTHER PUBLICATIONS

Examiner's Report issued under Canadian Application No. 2723586 dated Mar. 12, 2012 (3 pages).
Office Action issued in corresponding Eurasian Appliation No. 201071270 dated Mar. 20, 2012 (3 pages).
International Search Report from PCT/US2009/042700 dated Dec. 16, 2009 (2 pages).
Written Opinion from PCT/US2009/042700 dated Dec. 16, 2009 (4 pages).
Search Report issued in corresponding European Application No. 09743386.6 dated Oct. 24, 2011 (8 pages).
Correspondence reporting an Office Action issued May 2, 2013 in corresponding Mexican application No. MX/a/2010/012056 (7 pages).
Communication pursuant to Article 94(3) EPC issued Jun. 10, 2013 in corresponding EPO application No. 09 743 386.6 (6 pages).

(Continued)

*Primary Examiner* — Daniel P Stephenson
(74) *Attorney, Agent, or Firm* — Osha • Liang LLP

(57) ABSTRACT

A wellbore fluid that includes an aqueous base fluid; a chelating agent; and at least one enzyme, wherein the wellbore fluid has a pH of at least 6.5 is disclosed.

17 Claims, 1 Drawing Sheet

(56) References Cited

OTHER PUBLICATIONS

Second Office Action (w/translation) issued Jun. 20, 2013 in corresponding Chinese application No. 200980126169.9 (9 pages).

Communication pursuant to Article 94(3) EPC issued Dec. 18, 2012 in corresponding EPO application No. 09 743 386.6 (6 pages).
First Office Action (w/translation) issued Dec. 6, 2012 in corresponding Chinese application No. 200980126169.9 (12 pages).

* cited by examiner

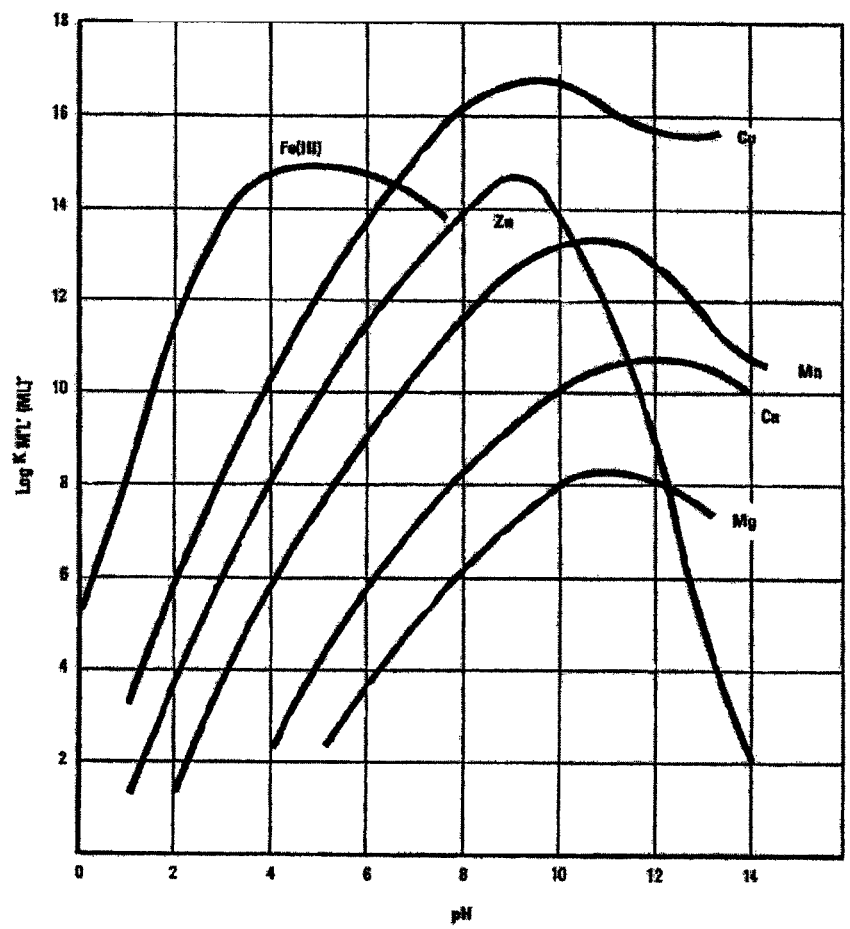

HIGH DENSITY BREAKER FLUIDS AND METHODS OF USE THEREOF

BACKGROUND OF INVENTION

1. Field of the Invention

Embodiments disclosed herein relate generally to fluids for use in breaking filter cakes from wellbores. Additionally, embodiments disclosed herein also relate generally to methods of using such fluids.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

One way of protecting the formation is by forming a filter cake on the surface of the subterranean formation. Filter cakes are formed when particles suspended in a wellbore fluid coat and plug the pores in the subterranean formation such that the filter cake prevents or reduce both the loss of fluids into the formation and the influx of fluids present in the formation. A number of ways of forming filter cakes are known in the art, including the use of bridging particles, cuttings created by the drilling process, polymeric additives, and precipitates. Fluid loss pills may also be used where a viscous pill comprising a polymer may be used to reduce the rate of loss of a wellbore fluid to the formation through its viscosity Upon completion of drilling, the filter cake and/or fluid loss pill may stabilize the wellbore during subsequent completion operations such as placement of a gravel pack in the wellbore. Additionally, during completion operations, when fluid loss is suspected, a fluid loss pill of polymers may be spotted into to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location.

After any completion operations have been accomplished, removal of filter cake (formed during drilling and/or completion) remaining on the sidewalls of the wellbore may be necessary. Although filter cake formation and use of fluid loss pills are essential to drilling and completion operations, the barriers can be a significant impediment to the production of hydrocarbon or other fluids from the well if, for example, the rock formation is still plugged by the barrier. Because filter cake is compact, it often adheres strongly to the formation and may not be readily or completely flushed out of the formation by fluid action alone.

The problems of efficient well clean-up and completion are a significant issue in all wells, and especially in open-hole horizontal well completions. The productivity of a well is somewhat dependent on effectively and efficiently removing the filter cake while minimizing the potential of water blocking, plugging, or otherwise damaging the natural flow channels of the formation, as well as those of the completion assembly.

Accordingly, there exists a continuing need for breaker fluids that effectively clean the well bore and do not inhibit the ability of the formation to produce oil or gas once the well is brought into production.

SUMMARY OF INVENTION

In one aspect, embodiments disclosed herein relate to a wellbore fluid that includes an aqueous base fluid; a chelating agent; and at least one enzyme, wherein the wellbore fluid has a pH of at least 6.5.

In another aspect, embodiments disclosed herein relate to a method of cleaning a wellbore drilled with a wellbore fluid that forms a filter cake, the method including emplacing a breaker fluid into the wellbore, the breaker fluid comprising: an aqueous fluid; a chelating agent; and at least one enzyme, wherein the wellbore fluid has a pH of at least 6.5; and shutting in the well for a period of time sufficient to initiate breaking of the filter cake Other aspects and advantages of the invention will be apparent from the following description and the appended claims.

BRIEF DESCRIPTION OF DRAWINGS

FIG. 1 shows conditional stability constants with respect to pH for EDTA with select metals.

DETAILED DESCRIPTION

In one aspect, embodiments disclosed herein relate to high density breaker fluids and methods of use thereof. In particular, embodiments disclosed herein relate to breaker fluids having a density greater than 9.5 ppg for use in wellbores in which a higher than convention density fluid is desired.

As mentioned above, breaker fluids are designed to destroy the integrity of a residual filter cake created during the drilling process by removing some or all drilling fluid components that form the filter cake. Filter cake breaking may be classified into two general approaches: "dispersion" of the filter cake or "dissolution" of the filter cake. In the case of dispersion, the primary filter cake components (fluid loss agents) are destroyed, typically leaving the bridging agents (often calcium carbonate) to flow back, screen-out or become incorporated into a gravel pack, whereas in the case of dissolution, both the fluid loss agents and the bridging agents are desirably destroyed.

Dissolution (breaking of bridging agents in addition to fluid loss agents) conventionally relies on acid dissolution of the bridging agents coupled with oxidative or enzymatic breaking of the fluid loss agents. Acid dissolution often replies on mild acids such as carboxylic acids including formic acid, acetic acid, citric acid, ethylenediamine tetraacetic acid (or salt derivatives thereof), etc. However, limitations on the operational densities at which breaker fluids containing such acid species may exist due to lower solubility limits at low pHs. Such operational densities for acid-based breaker fluids are typically limited to densities of up to 9.5 ppg.

However, the inventors of the present disclosure have advantageously discovered breaker fluids effective in breaking up bridging agents and fluid loss agents that also may have densities greater than that traditionally attainable with acid-based components. Specifically, densities greater than 9.5 ppg, and 10 ppg in more specific embodiments, may be attained using breaker fluids comprising at least one chelating agent and at least one polymeric degradation agent. Further, such fluids may be provided at a pH greater than about 6.5 in some embodiments and greater than 7.5, and 8 in other embodiments. Thus, embodiments of the present disclosure rely on breaking of the bridging agents present in a filter cake by chelation rather than acid dissolution.

In some embodiments, the chelating agent that may be used may be a polydentate chelator such that multiple bonds are formed with the complexed ion, e.g., calcium from the calcium carbonate. Selection of a chelating agent may be based on the conditional stability constant (the practical expression of the chelate strength of the chelating agent for a certain metal ion) of the chelating agent and the pH dependence of the conditional stability constant. That is, for a particular ion to be sequestered by the chelating agent, a chelating agent having a relatively high conditional stability constant may be used in a pH range in which the conditional stability constant is at its peak. For example, for ethylenediaminetetraacetic acid (EDTA), as shown in FIG. 1, the conditional stability constant is peaks at around a pH of 10-12, i.e., the optimum pH to "chelate" calcium is in the range of 10-12, whereas at a pH of ~5 (the pH of a conventional acid-based breaker using EDTA), the conditional strength constant is significantly lower, indicating that EDTA would not chelate at such pH. From the desired pH, the appropriate chelator salt may be selected. Thus, for EDTA, $X_2$EDTA has a maximum concentration at a pH of 4-5, $X_3$EDTA has its maximum concentration at a pH of 8-9, and $X_4$EDTA has a maximum concentration at a pH above 12. Further, in addition to such chelating agents possessing higher chelating strengths at higher pHs, the solubility of such chelating agents increases with increasing pH. Thus, for EDTA potassium salts, the solubility of EDTA at a pH over 6 is over four times greater than that at a pH of 4.5.

Polydentate chelators suitable for use in the breaker fluids of the present disclosure may include, for example, salts of ethylenediaminetetraacetic acid (EDTA), diethylenetriaminepentaacetic acid (DTPA), nitrilotriacetic acid (NTA), ethylene glycol-bis(2-aminoethyl)-N,N,N',N'-tetraacetic acid (EGTA), 1,2-bis(o-aminophenoxy)ethane-N,N,N',N'-tetraaceticacid (BAPTA), cyclohexanediaminete-traacetic acid (CDTA), triethylenetetraaminehexaacetic acid (TTHA), N-(2-Hydroxyethyl)ethylenediamine-N,N',N'-triacetic acid (HEDTA), glutamic-N,N-diacetic acid (GLDA), ethylenediamine tetra-methylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETPMP), amino tri-methylene phosphonic acid (ATMP), and mixtures thereof. Such salts may include potassium or sodium salts thereof, for example. However, this list is not intended to have any limitation on the chelating agents (or salt types) suitable for use in the embodiments disclosed herein. One of ordinary skill in the art would recognize that selection of the chelating agent may depend on a variety of factors. In particular, the selection of the chelating agent may be related to the specificity of the chelating agent to the particular cations desired to be chelated, the log K value, the optimum pH for sequestering and the commercial availability of the chelating agent, as well as downhole conditions, etc.

In a particular embodiment, the chelating agent used in the breaker fluids of the present disclosure is $K_3$EDTA. However, depending on the pH of the solution, some levels of a dipotassium or tetrapotassium salt may also be present in the solution. EDTA is an amino acid, as shown below, with four carboxylate and two amine groups. This polydentate chelator is typically used to sequester di- and trivalent ions.

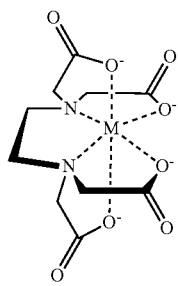

For metals having stronger catalytic power, stronger chelating agents may need to be used. For example, of several example chelating agents, the chelating power is, from strongest to weakest, DTPA, EDTA, GLDA, and HEDTA. Thus, incorporation of a chelating agent, at a pH sufficient for the chelating agent to have sufficient chelating strength into a breaker fluid may serve to chelate cations forming bridging agents, thus aiding in the dissolution and degradation of a filter cake having such bridging agents formed therein. Chelating agents may be present in an amount ranging from 20 to 90 weight percent of the breaker fluid. In a particular embodiment, the chelating agent may be present in an amount ranging from 25 to 65 percent by weight of the breaker fluid.

In addition to a chelating agent, the breaker fluids of the present disclosure may include at least one polymeric degradation agent for breaking of polymeric fluid loss agents within the filter cake. Such polymeric degradation agents may include enzymes and/or oxidants A wide variety of enzymes have been identified and separately classified according to their characteristics. A detailed description and classification of known enzymes is provided in the reference entitled ENZYME NOMENCLATURE (1984): RECOMMENDATIONS OF THE NOMENCLATURE COMMITTEE OF THE INTERNATIONAL UNION OF BIOCHEMISTRY ON THE NOMENCLATURE AND CLASSIFICATION OF ENZYME-CATALYSED REACTIONS (Academic Press 1984) [hereinafter referred to as "Enzyme Nomenclature (1984)"], the disclosure of which is fully incorporated by reference herein. According to Enzyme Nomenclature (1984), enzymes can be divided into six classes, namely (1) Oxidoreductases, (2) Transferases, (3) Hydrolases, (4) Lyases, (5) Isomerases, and (6) Ligases. Each class is further divided into subclasses by action, etc. Although each class may include one or more enzymes that will degrade one or more polymeric additives present in a wellbore fluid (and thus filter cake), the classes of enzymes in accordance with Enzyme Nomenclature (1984) most useful in the methods of the present invention are (3) Hydrolases, (4) Lyases, (2) Transferases, and (1) Oxidoreductases. Of these, enzymes of classes (3) and (4) may be the most applicable to the present disclosure.

Examples of enzymes within classes (1)-(4) according to Enzyme Nomenclature (1984) for use in accordance with the methods of the present disclosure are described in Table I below:

TABLE I

Class (3) Hydrolases (enzymes functioning to catalyze the hydrolytic cleavage of various bonds including the bonds C—O, C—N, and C—C)
    3.1 - Enzymes Acting on Ester Bonds
        3.1.3 - Phosphoric monoester hydrolases
    3.2 - Glycosidases TABLE I-continued 3.2.1.1 - alpha-Amylase
    3.2.1.2 - beta-Amylase
    3.2.1.3 - Glucan 1,4-alpha-glucosidase
    3.2.1.4 - Cellulase
    3.2.1.11 - Dextranase
    3.2.1.20 - alpha-Glucosidase
    3.2.1.22 - alpha-Galactosidase
    3.2.1.25 - beta-Mannosidase
    3.2.1.48 - Sucrase
    3.2.1.60 - Glucan 1,4-alpha-maltotetraohydrolase
    3.2.1.70 - Glucan 1,6-alpha-glucosidase
  3.4 - Enzymes Acting on Peptide Bonds (peptide hydrolases)
    3.4.22 - Cysteine proteinases
    3.4.22.2 - Papain
    3.4.22.3 - Fecin
    3.4.22.4 - Bromelin
Class (4) Lyases (enzymes cleaving C—C, C—O, C—N
and other bonds by means other than hydrolysis or oxidation)
    4.1 - Carbon--carbon lyases
    4.2 - Carbon--oxygen lyases
    4.3 - Carbon--nitrogen lyases
Class (2) Transferases (enzymes transferring a group, for example,
a methyl group or a glyccosyl group, from one compound (donor) to
another compound (acceptor)
    2.1 - Transferring one-carbon groups
      2.1.1 - Methyltransferases
    2.4 - Glycosyltransferases
      2.4.1.1 - Phosphorylase
Class (1) Oxidoreductases (enzymes catalyzing oxidoreductions)
    1.1 - Acting on the CH—OH group of donors
      1.1.1.47 - glucose dehyogenase Further, one skilled in the art would appreciate that selection of an enzyme for a particular filter cake clean up application may depend on various factors such as the type of polymeric additive used in the wellbore fluid, for example, carboxymethylcellulose, hydroxyethylcellulose, guar, xanthan, glucans and starch, the temperature of the wellbore, the pH selected for chelating strength, etc. In particular embodiments, endo-amylase, exo-amylase, isomylase, glucosidase, amylo-glucosidase, malto-hydrolase, maltosidase, isomalto-hydro-lase or malto-hexaosidase may be used in the breaker fluids of the present disclosure. Such enzymes may be present in an amount ranging from 1 to 10 weight percent of the fluid.

Alternatively, an oxidant may be included in the breaker fluid, to aid in breaking or degradation of polymeric additives present in a filter cake. Examples of such oxidants may include any one of those oxidative breakers known in the art to react with polymers such as polysaccharides to reduce the viscosity of polysaccharide-thickened compositions or disrupt filter cakes. Such compounds may include peroxides (including peroxide adducts), other compounds including a peroxy bond such as persulphates, perborates, percarbonates, perphosphates, and persilicates, and other oxidizers such as hypochlorites, which may optionally be encapsulated as taught by U.S. Pat. No. 6,861,394, which is assigned to the present assignee and herein incorporated by reference in its entirety. Further, use of an oxidant in a breaker fluid, in addition to affecting polymeric additives, may also cause fragmentation of swollen clays, such as those that cause bit balling. Such oxidants may be present in an amount ranging from 1 to 10 weight percent of the fluid.

The breaker fluid may contain an aqueous fluid optionally containing salts therein, such as brine or sea water (depending on requirements of a well). For example, the aqueous fluid may be formulated with mixtures of desired salts in fresh water. Such salts may include, but are not limited to alkali metal chlorides, hydroxides, or carboxylates including those based on formate, acetate, citrate, for example. In various embodiments of the fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, aluminum, potassium, strontium, and lithium salts of chlorides, bromides, carbonates, phosphates, sulfates, silicates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the breaker fluids disclosed herein may be natural or synthetic, with synthetic brines tending to be much simpler in constitution. Thus, no limitation on the presence of other salts is intended to be placed on the present application.

In a particular embodiment, a brine may include halide or carboxylate salts of monovalent cations such as cesium, potassium, and/or sodium. The density of the breaker fluid may be controlled by increasing the salt concentration in the brine (up to saturation), as well as by increasing the amount of chelating agent salt. One skilled in the art would appreciate that such density control may be particularly desirable in order to control bottom hole pressures and/or to prevent (or reduce) movement of a spotted fluid within the wellbore from the section of the wellbore requiring filter cake removal. For example, in accordance with various embodiments of the present disclosure, high density fluids of greater than 9.5 ppg, greater than 10 ppg, and greater than 10.5 ppg may be achieved using chelating agents in the manner as described herein.

The breaker fluid may also optionally contain a mutual solvent, which may aid in reducing surface tension, respectively. For example, where increased penetration rate into the filter cake is desired, a mutual solvent may be preferably included to decrease the viscosity of the fluid and increase penetration of the fluid components into the filter cake to cause fragmentation thereof. Conversely, where additional delay is desired, a lesser amount or zero mutual solvent may be included to increase viscosity and thus reduce penetration rate.

One example of a suitable mutual solvent may be a glycol ether or glycerol. In a particular embodiment, the mutual solvent is ethylene glycol monobutyl ether (EGMBE). The use of the term "mutual solvent" includes its ordinary meaning as recognized by those skilled in the art, as having solubility in both aqueous and oleaginous fluids. In some embodiments, the solvent may be substantially completely soluble in each phase while in select other embodiment, a lesser degree of solubilization may be acceptable. Further, in a particular embodiment, selection of a mutual solvent may depend on factors such as the type and amount of salt present in the fluid.

Further, the breaker fluid may also contain a surfactant, which may aid in dispersing insoluble solids from the filter cake upon breaking of the filter cake. Specifically, such surfactant may promote water-wetting of solids within the filter cake and disperse active clays. Surfactants or surface active agents have an amphiphilic molecular structure, that is, a structure that is polar (hydrophilic) at one end and nonpolar (lipophilic/hydrophobic) at the other. Generally, hydrophilic groups may be cationic (organic amines—especially with three hydrocarbon chains attached to the nitrogen atom), anionic (fatty acids or sulfates with hydrocarbon chains) or nonionic (organic compounds with oxygen containing groups such as alcohols, esters and ethers) while hydrophobic or lipophilic groups may be large, straight or branched chain hydrocarbons, cyclic hydrocarbons, aromatic hydrocarbons, and/or combinations thereof.

Depending on the type of material in the filter cake to be dispersed, a surface active agent having the appropriate HLB may be selected. The term "HLB" (Hydrophilic Lipophilic Balance) refers to the ratio of the hydrophilicity of the polar groups of the surface-active molecules to the hydrophobicity of the lipophilic part of the same molecules. In some embodiments, it may be desirable to have a high (greater than 10) or mid-to-high HLB ranging from 3 to 15, or 5 to 14 in other embodiments. In a particular embodiment, the HLB may range from 7 to 9.

In a particular embodiment, surface active agents may include, for example, sorbitan esters and ethers, such as sorbitan monolaurate, stearyl esters such as pyrrolidone carboxylic acid monostearin ester, ethoxylated stearyl stearate, polyoxyethylene distearate, PEG (8) distearate, decaglyceryl tristearate, polyoxyethylene distearate, saccharose distearate, polyethylene glycol (5) glyceryl stearate, polyethylene glycol (5) glyceryl stearate, polyoxyethylene fatty acid esters such as polyoxyethylene fatty acid ester, ethoxylated oleic acid, polyoxyethylene monooleate, polyoxyethylene phenyl ethers such as nonylphenol ethoxylate, polyoxyethylene nonylphenol ether, nonylphenol ethylene oxide condensate, octylphenol ethylene oxide condensate, polyethylene glycol fatty acid esters such as polyethylene glycol 200 monolaurate, polyethylene glycol 400 dioleate, polyglycol-300 oleate, polyoxythylene (5) derivative of distilled lanolin acids, polyethylene glycol (6) oleate, polyglycol oleate, PEG 400 dioleate, polyethylene glycol (5) glyceryl stearate, polyoxyethylene fatty alcohol ethers such as coceth-27, fatty alcohol ethoxylates (C12-C13), cetyl/oleyl alcohol ethylene oxide, tri-ethoxylated tridecyl alcohol, polyoxythylene (5) derivative of distilled lanolin alcohols, laureth-3, natural primary alcohol ethylene oxide condensate, synthetic primary alcohol ethoxylate, polyoxyethylene glycol ethers such as polyoxyalkylene glycol, polyethylene glycol alkyl ethers such as fatty alcohol polyglycol ether, as well as castor oil ethoxylate, nonylphenol polyglycol ether, decaglyceryl trioleate, diglyceryl dioleate, polyoxythylene (6) derivative of sorbitol beeswax, tri-polyoxyethylene ether phosphate, condensate of ethylene oxide, polypropylene glycol ethoxylate, calcium dodecylbenzenesulfonate, branched synthetic alcohol ethoxylate, and polyoxyethylene castor oil ether.

Further, one of ordinary skill in the art would appreciate that this list is not exhaustive, and that other surface active agents may be used in accordance with embodiments of the present disclosure. Such surface active agents may be used, for example, at about 0.1% to 3% by weight of the fluid, which is sufficient for most applications. However, one of ordinary skill in the art would appreciate that in other embodiments, more or less may be used.

Breaker fluids of embodiments of this disclosure be emplaced in the wellbore using conventional techniques known in the art, and may be used in drilling, completion, workover operations, etc. Additionally, one skilled in the art would recognize that such wellbore fluids may be prepared with a large variety of formulations. Specific formulations may depend on the stage in which the fluid is being used, for example, depending on the depth and/or the composition of the formation. The breaker fluids described above may be adapted to provide improved breaker fluids under conditions of high temperature and pressure, such as those encountered in deep wells, where high densities are required. Further, one skilled in the art would also appreciate that other additives known in the art may be added to the breaker fluids of the present disclosure without departing from the scope of the present disclosure.

As described above, the breaker fluid may be circulated in the wellbore during or after the performance of the at least one completion operation. In other embodiments, the breaker fluid may be circulated either after a completion operation or after production of formation fluids has commenced to destroy the integrity of and clean up residual drilling fluids remaining inside casing or liners.

Generally, a well is often "completed" to allow for the flow of hydrocarbons out of the formation and up to the surface. As used herein, completion processes may include one or more of the strengthening the well hole with casing, evaluating the pressure and temperature of the formation, and installing the proper completion equipment to ensure an efficient flow of hydrocarbons out of the well or in the case of an injector well, to allow for the injection of gas or water. Completion operations, as used herein, may specifically include open hole completions, conventional perforated completions, sand exclusion completions, permanent completions, multiple zone completions, and drainhole completions, as known in the art. A completed wellbore may contain at least one of a slotted liner, a predrilled liner, a wire wrapped screen, an exapandable screen, a sand screen filter, a open hole gravel pack, or casing.

Breaker fluids as disclosed herein may also be used in a cased hole to remove any drilling fluid left in the hole during any drilling and/or displacement processes. Well casing may consist of a series of metal tubes installed in the freshly drilled hole. Casing serves to strengthen the sides of the well hole, ensure that no oil or natural gas seeps out of the well hole as it is brought to the surface, and to keep other fluids or gases from seeping into the formation through the well. Thus, during displacement operations, typically, when switching from drilling with an oil-based mud to a water-based mud (or vice-versa), the fluid in the wellbore is displaced with a different fluid. For example, an oil-based mud may be displaced by another oil-based displacement to clean the wellbore. The oil-based displacement fluid may be followed with a water-based displacement fluid prior to beginning drilling or production. Conversely, when drilling with a water-based mud, prior to production, the water-based mud may be displacement water-based displacement, followed with an oil-based displacement fluid. Further, one skilled in the art would appreciate that additional displacement fluids or pills, such as viscous pills, may be used in such displacement or cleaning operations as well, as known in the art.

Another embodiment of the present disclosure involves a method of cleaning up a well bore drilled with a water based or oil based drilling fluid. In one such illustrative embodiment, the method involves circulating a breaker fluid disclosed herein in a wellbore, and then shutting in the well for a predetermined amount of time to allow penetration and fragmentation of the filter cake to take place. Upon fragmentation of the filter cake, the residual drilling fluid may be easily washed out of the well bore. Alternatively, a wash fluid (different from the breaker fluid) may be circulated through the wellbore prior to commencing production.

The fluids disclosed herein may also be used in a wellbore where a screen is to be put in place down hole. After a hole is under-reamed to widen the diameter of the hole, drilling string may be removed and replaced with production tubing having a desired sand screen. Alternatively, an expandable tubular sand screen may be expanded in place or a gravel pack may be placed in the well. Breaker fluids may then be placed in the well, and the well is then shut in to allow penetration and fragmentation of the filter cake to take place. Upon fragmentation of the filter cake, the fluids can be easily produced from the well bore upon initiation of production and thus the residual drilling fluid is easily washed out of the well bore. Alternatively, a wash fluid (different from the breaker fluid) may be circulated through the wellbore prior to commencing production.

However, the breaker fluids disclosed herein may also be used in various embodiments as a displacement fluid and/or a wash fluid. As used herein, a displacement fluid is typically used to physically push another fluid out of the wellbore, and a wash fluid typically contains a surfactant and may be used to physically and chemically remove drilling fluid reside from downhole tubulars. When also used as a displacement fluid, the breaker fluids of the present disclosure may act effectively push or displace the drilling fluid. When also used as a wash fluid, the breaker fluids may assist in physically and/or chemically removing the filter cake once the filter cake has been disaggregated by the breaker system.

In another embodiment, a breaker fluid disclosed herein may be used in the production of hydrocarbons from a formation. Following the drilling of a formation with an drilling mud, at least one completion operation may be performed on the well. A breaker fluid may then be circulated in the well, and the well may be shut for a predetermined time to allow for breaking of the filter cake formed on the walls therein. Formation fluids may then enter the well and production of the formation fluids may ensue. Alternatively, a wash fluid (different from the breaker fluid) may be circulated through the wellbore prior to commencing production of formation fluid.

Advantageously, embodiments of the present disclosure for at least one of the following. Use of the breaker fluids of the present disclosure may allow for breaking of bridging agents contained within a filter cake without use of acid-based fluids conventionally used in breaking such additives. Elimination of a low pH system and use of a mid-to-high pH system may allow for increased solubility of chelating agents, therefore providing for achievement of higher density breaker fluids. Further, by increasing the pH, increased chelating strength and optimum pH conditions for chelating calcium carbonate may be observed. Further, risk of corrosion may be reduced by removing low pH solutions. Further, higher densities may be achieved with a reduced amount of expensive brines such as sodium bromide (or use of such brines may even be eliminated).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:
1. A wellbore fluid, comprising:
 an aqueous base fluid;
 a chelating agent, wherein the chelating agent comprises $K_3EDTA$; and
 at least one enzyme,
 wherein the wellbore fluid has a pH of at least 7.5.
2. The wellbore fluid of claim 1, wherein the wellbore fluid has a density of greater than 9.5 ppg.
3. The wellbore fluid of claim 2, wherein the wellbore fluid has a density of greater than 10 ppg.
4. The wellbore fluid of claim 1, wherein the wellbore fluid has a pH of at least 8.
5. The wellbore fluid of claim 1, further comprising:
 at least one mutual solvent.
6. The wellbore fluid of claim 1, further comprising:
 at least one surfactant.
7. The wellbore fluid of claim 1, wherein the aqueous base fluid comprises monovalent salts therein.
8. A method of cleaning a wellbore drilled with a wellbore fluid that forms a filter cake, the method comprising:
 emplacing a breaker fluid into the wellbore, the breaker fluid comprising:
  an aqueous fluid;
  a chelating agent, wherein the chelating agent comprises $K_3EDTA$; and
  at least one enzyme, wherein the wellbore fluid has a pH of at least 7.5; and
 shutting in the well for a period of time sufficient to initiate breaking of the filter cake.
9. The method of claim 8, further comprising:
 collecting the breaker fluid having at least a portion of the broken filter cake therein.
10. The method of claim 8, further comprising:
 circulating a wash fluid through the wellbore.
11. The method of claim 8, further comprising:
 initiating production of formation fluids through the wellbore.
12. The method of claim 8, further comprising:
 performing at least one completion operation in the wellbore.
13. The method of claim 8, wherein the breaker fluid has a density of greater than 9.5 ppg.
14. The method of claim 13, wherein the breaker fluid has a density of greater than 10 ppg.
15. The method of claim 8, wherein the breaker fluid has a pH of at least 8.
16. The method of claim 8, wherein the aqueous base fluid comprises monovalent salts therein.
17. A wellbore fluid, comprising:
 an aqueous base fluid;
 a chelating agent, wherein the chelating agent is $K_3EDTA$; and
 at least one enzyme,
 wherein the wellbore fluid has a pH of at least 6.5.

* * * * *